(12) United States Patent
Harris et al.

(10) Patent No.: US 9,715,526 B2
(45) Date of Patent: *Jul. 25, 2017

(54) FAIR SCHEDULING FOR MIXED-QUERY LOADS

(71) Applicant: Palantir Technologies, Inc., Palo Alto, CA (US)

(72) Inventors: Michael Harris, Palo Alto, CA (US); John Carrino, Palo Alto, CA (US); Eric Wong, San Mateo, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,211

(22) Filed: May 29, 2015

(65) Prior Publication Data

US 2015/0261817 A1    Sep. 17, 2015

Related U.S. Application Data

(63) Continuation of application No. 13/826,228, filed on Mar. 14, 2013, now Pat. No. 9,092,482.

(51) Int. Cl.
*G06F 17/30*    (2006.01)

(52) U.S. Cl.
CPC .. *G06F 17/30463* (2013.01); *G06F 17/30442* (2013.01); *G06F 17/30451* (2013.01); *G06F 17/30477* (2013.01); *G06F 17/30864* (2013.01)

(58) Field of Classification Search
CPC ......... G06F 17/30463; G06F 17/30442; G06F 17/30451; G06F 17/30477; G06F 17/30864

(Continued)

(56) References Cited

U.S. PATENT DOCUMENTS 5,568,390 A    10/1996   Hirota et al.
5,724,575 A    3/1998    Hoover et al.
(Continued)

FOREIGN PATENT DOCUMENTS

AU    2014206155    12/2015
CN    103324724     9/2013
(Continued)

OTHER PUBLICATIONS

Quest, "Toad for ORACLE 11.6—Guide to Using Toad," Sep. 24, 2012, pp. 1-162.

(Continued)

*Primary Examiner* — Jensen Hu
(74) *Attorney, Agent, or Firm* — Hickman Palermo Becker Bingham LLP; Adam C. Stone

(57) ABSTRACT

A fair scheduling system with methodology for fairly scheduling queries for execution by a database management system. The system obtains query jobs for execution by the database management system and cost estimates to execute the query jobs. The cost estimate can be a number of results the query is expected to return. Based on the cost estimates, the system causes the database management system to execute the query jobs as separately sub-query tasks in a round-robin fashion. By doing so, the execution latency of "low cost" query jobs that return few results is reduced when the query jobs are concurrently executed with "high cost" query jobs that return a large number of results.

18 Claims, 5 Drawing Sheets

(58) Field of Classification Search
USPC .......................................................... 707/718
See application file for complete search history.

(56) References Cited

U.S. PATENT DOCUMENTS

| | | | |
|---|---|---|---|
| 5,857,329 A | 1/1999 | Bingham |
| 5,872,973 A | 2/1999 | Mitchell et al. |
| 5,897,636 A | 4/1999 | Kaeser |
| 5,902,349 A | 5/1999 | Endo et al. |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,496,774 B1 | 12/2002 | Davies |
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,608,559 B1 | 8/2003 | Lemelson et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,622 B1 | 6/2006 | Tedesco |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,461,158 B2 | 12/2008 | Rider et al. |
| 7,603,229 B2 | 10/2009 | Goldberg et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,818,291 B2 | 10/2010 | Ferguson et al. |
| 7,941,321 B2 | 5/2011 | Greenstein et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,042,110 B1 | 10/2011 | Kawahara et al. |
| 8,046,283 B2 | 10/2011 | Burns |
| 8,108,138 B2 | 1/2012 | Bruce et al. |
| 8,112,425 B2 | 2/2012 | Baum et al. |
| 8,126,848 B2 | 2/2012 | Wagner |
| 8,185,819 B2 | 5/2012 | Sah et al. |
| 8,229,902 B2 | 7/2012 | Vishniac et al. |
| 8,352,174 B2 | 1/2013 | Milstein et al. |
| 8,417,409 B2 | 4/2013 | Bast et al. |
| 8,504,542 B2 | 8/2013 | Chang et al. |
| 8,676,857 B1 | 3/2014 | Adams et al. |
| 8,763,078 B1 | 6/2014 | Castellucci et al. |
| 8,786,605 B1 | 7/2014 | Curtis et al. |
| 8,930,331 B2 | 1/2015 | McGrew et al. |
| 8,954,410 B2 | 2/2015 | Chang et al. |
| 9,009,827 B1 | 4/2015 | Albertson |
| 9,043,696 B1 | 5/2015 | Meiklejohn et al. |
| 9,092,482 B2 * | 7/2015 | Harris ............... G06F 17/30451 |
| 9,116,975 B2 | 8/2015 | Shankar et al. |
| 9,208,159 B2 | 12/2015 | Stowe et al. |
| 9,230,280 B1 | 1/2016 | Maag et al. |
| 9,280,532 B2 | 3/2016 | Cicerone |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2004/0153418 A1 | 8/2004 | Hanweck |
| 2004/0220923 A1 | 11/2004 | Nica |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0283465 A1 | 12/2005 | Dettinger et al. |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129540 A1 * | 6/2006 | Hillis ................. G06F 17/3053 |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0241856 A1 | 10/2006 | Cobleigh et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2007/0050328 A1 * | 3/2007 | Li ..................... G06F 17/30967 |
| 2007/0050429 A1 | 3/2007 | Goldring et al. |
| 2007/0061487 A1 | 3/2007 | Moore et al. |
| 2007/0088596 A1 | 4/2007 | Berkelhamer et al. |
| 2007/0143253 A1 | 6/2007 | Kostamaa et al. |
| 2007/0185850 A1 | 8/2007 | Walters et al. |
| 2007/0198571 A1 | 8/2007 | Ferguson et al. |
| 2007/0220604 A1 | 9/2007 | Long |
| 2007/0233756 A1 | 10/2007 | D'Souza et al. |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2008/0301559 A1 | 12/2008 | Martinsen et al. |
| 2008/0313281 A1 | 12/2008 | Scheidl et al. |
| 2009/0031247 A1 | 1/2009 | Walter et al. |
| 2009/0037417 A1 | 2/2009 | Shankar et al. |
| 2009/0037912 A1 | 2/2009 | Stoitsev et al. |
| 2009/0106308 A1 | 4/2009 | Killian et al. |
| 2009/0164387 A1 | 6/2009 | Armstrong et al. |
| 2009/0172669 A1 | 7/2009 | Bobak et al. |
| 2009/0177962 A1 | 7/2009 | Gusmorino et al. |
| 2009/0204570 A1 | 8/2009 | Wong |
| 2009/0240664 A1 | 9/2009 | Dinker et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2009/0319418 A1 | 12/2009 | Herz |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0082655 A1 * | 4/2010 | Silberstein ........ G06F 17/30477 707/759 |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0162371 A1 | 6/2010 | Geil |
| 2010/0191884 A1 | 7/2010 | Holenstein et al. |
| 2010/0205662 A1 | 8/2010 | Ibrahim et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0318838 A1 | 12/2010 | Katano et al. |

(56) References Cited

U.S. PATENT DOCUMENTS

| | | | |
|---|---|---|---|
| 2010/0325581 | A1 | 12/2010 | Finkelstein et al. |
| 2011/0029498 | A1 | 2/2011 | Ferguson et al. |
| 2011/0041084 | A1 | 2/2011 | Karam |
| 2011/0047540 | A1 | 2/2011 | Williams et al. |
| 2011/0153592 | A1* | 6/2011 | DeMarcken ........... G06Q 10/02 707/713 |
| 2011/0161132 | A1 | 6/2011 | Goel et al. |
| 2011/0173619 | A1 | 7/2011 | Fish |
| 2011/0184813 | A1 | 7/2011 | Barnes et al. |
| 2011/0185401 | A1 | 7/2011 | Bak et al. |
| 2011/0258158 | A1 | 10/2011 | Resende et al. |
| 2011/0258242 | A1 | 10/2011 | Eidson et al. |
| 2011/0270812 | A1 | 11/2011 | Ruby |
| 2012/0013684 | A1 | 1/2012 | Lucia |
| 2012/0072825 | A1 | 3/2012 | Sherkin et al. |
| 2012/0101952 | A1 | 4/2012 | Raleigh et al. |
| 2012/0123989 | A1 | 5/2012 | Yu et al. |
| 2012/0124179 | A1 | 5/2012 | Cappio et al. |
| 2012/0136804 | A1 | 5/2012 | Lucia |
| 2012/0150791 | A1 | 6/2012 | Willson |
| 2012/0159307 | A1 | 6/2012 | Chung et al. |
| 2012/0290506 | A1 | 11/2012 | Muramatsu et al. |
| 2012/0330908 | A1 | 12/2012 | Stowe et al. |
| 2013/0036346 | A1 | 2/2013 | Cicerone |
| 2013/0060742 | A1 | 3/2013 | Chang et al. |
| 2013/0097130 | A1 | 4/2013 | Bingol et al. |
| 2013/0151388 | A1 | 6/2013 | Falkenborg |
| 2013/0231862 | A1 | 9/2013 | Delling et al. |
| 2013/0286601 | A1 | 10/2013 | Shin et al. |
| 2013/0304770 | A1 | 11/2013 | Boero et al. |
| 2013/0318060 | A1 | 11/2013 | Chang et al. |
| 2014/0081685 | A1 | 3/2014 | Thacker et al. |
| 2014/0095540 | A1* | 4/2014 | Hsiao ................ G06F 17/30442 707/774 |
| 2014/0149272 | A1 | 5/2014 | Hirani et al. |
| 2014/0181833 | A1* | 6/2014 | Bird ...................... G06F 9/5016 718/105 |
| 2014/0324876 | A1 | 10/2014 | Konik et al. |
| 2014/0344231 | A1 | 11/2014 | Stowe et al. |
| 2015/0039886 | A1 | 2/2015 | Kahol et al. |
| 2015/0089353 | A1 | 3/2015 | Folkening |
| 2015/0106347 | A1 | 4/2015 | McGrew et al. |
| 2015/0112956 | A1 | 4/2015 | Chang et al. |
| 2015/0120176 | A1 | 4/2015 | Curtis et al. |
| 2015/0212663 | A1 | 7/2015 | Papale et al. |
| 2015/0213043 | A1 | 7/2015 | Ishii et al. |
| 2015/0213134 | A1 | 7/2015 | Nie et al. |
| 2015/0227295 | A1 | 8/2015 | Meiklejohn et al. |
| 2015/0242397 | A1 | 8/2015 | Zhuang |
| 2015/0261817 | A1 | 9/2015 | Harris et al. |
| 2015/0341467 | A1 | 11/2015 | Lim et al. |
| 2016/0034545 | A1 | 2/2016 | Shankar et al. |
| 2016/0062555 | A1 | 3/2016 | Ward et al. |
| 2016/0147730 | A1 | 5/2016 | Cicerone |

FOREIGN PATENT DOCUMENTS

| | | |
|---|---|---|
| EP | 0652513 | 5/1995 |
| EP | 1926074 | 5/2008 |
| EP | 2555126 | 2/2013 |
| EP | 2863326 | 4/2015 |
| EP | 2876587 | 5/2015 |
| EP | 2891992 | 7/2015 |
| EP | 2993595 | 3/2016 |
| WO | WO 2012/025915 | 3/2012 |

OTHER PUBLICATIONS

Official Communication for Netherlands Patent Application No. 2012436 dated Nov. 6, 2015.
Official Communication for European Patent Application No. 151832721.8 dated Nov. 23, 2015.
Claims for Netherlands Patent Application No. 2012436 dated Nov. 2015, 5 pages.
U.S. Appl. No. 13/657,656, filed Oct. 22, 2012, Final Office Action, May 6, 2015.
U.S. Appl. No. 13/826,228, filed Mar. 14, 2013, Notice of Allowance, Mar. 27, 2015.
U.S. Appl. No. 14/192,767, filed Feb. 27, 2014, Notice of Allowance, Dec. 16, 2014.
U.S. Appl. No. 14/196,814, filed Mar. 4, 2014, Office Action, May 5, 2015.
U.S. Appl. No. 14/278,963, filed May 15, 2014, Final Office Action, Jan. 30, 2015.
U.S. Appl. No. 14/451,221, filed Aug. 4, 2014, Office Action, Apr. 6, 2015.
U.S. Appl. No. 14/504,103, filed Oct. 1, 2014, First Office Action, Interview Feb. 5, 2015.
U.S. Appl. No. 14/504,103, filed Oct. 1, 2014, Notice of Allowance, May 18, 2015.
U.S. Appl. No. 14/504,103, filed Oct. 1, 2014, First Office Action, Interview Mar. 31, 2015.
Chen et al., "A Novel Emergency Vehicle Dispatching System," 2013 IEEE 77th Vehicular Technology Conference, IEEE, Jun. 2, 2013, 5 pages.
Eklund et al., "A Dynamic Multi-source Dijkstra's Algorithm for Vehicle Routing," Intelligent Information Systems, 1996, pp. 329-333.
Hart et al., "A Formal Basis for the Heuristic Determination of Minimum Cost Paths," IEEE Transactions on Systems Science and Cybernetics, IEEE, vol. 1, No. 2. Jul. 1, 1968. pp. 100-107.
Jotshi et al., "Dispatching and Routing of Emergency Vehicles in Disaster Mitigation Using Data Fusion," Socio-Economic Planning Sciences, Pergamon, Amsterdam, Netherlands, vol. 43, No. 1, Mar. 1, 2009, 24 pages.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.
Official Communication for European Patent Application No. 14162372.8 dated Apr. 30, 2015.
Official Communication for Canadian Patent Application No. 2846414 dated Apr. 13, 2016.
"Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/, 5 pages.
Antoshenkov, Gennady, "Dictionary-Based Order-Preserving String Compression," The VLDB Journal, 1997, vol. 6, pp. 26-39.
"Apache HBase," <http://hbase.apache.org/> printed Sep. 14, 2011 in 1 page.
"BackTult—JD Edwards One World Version Control System," printed Jul. 23, 2007 in 1 page.
Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 12.
Ballesteros et al., "Batching: A Design Pattern for Efficient and Flexible Client/Server Interaction," Transactions on Pattern Languages of Programming, Springer Berlin Heildeberg, 2009, pp. 48-66.
Bernstein et al., "Hyder—A Transactional Record Manager for Shared Flash," 5th Biennial Conference on Innovative Data Systems Research (CIDR '11), Jan. 9-12, 2011, Asilomar, California, pp. 12.
Bogle et al., "Reducing Cross-Domain Call Overhead Using Batched Futures," SIGPLAN No. 29, (Oct. 10, 1994) pp. 341-354.

(56) References Cited

OTHER PUBLICATIONS

Chang et al., "Bigtable: A Distributed Storage System for Structured Data", Google, Inc., OSDI'06: Seventh Symposium on Operating System Design and Implementation, Seattle, WA, Nov. 2006, pp. 14.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Devanbu et al., "Authentic Third-party Data Publication," 2000, pp. 19, http://www.cs.ucdavis.edu/~devanbu/authdbpub.pdf.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Elmasri et al., "Fundamentals of Database Systems," 2004, Fourth Edition, pp. 455-491.

Hogue et al., "Thresher: Automating the Unwrapping of Semantic Content from the World Wide Web," 14$^{th}$ International Conference on World Wide Web, WWW 2005: Chiba, Japan, May 10-14, 2005, pp. 86-95.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada, pp. 1-10.

Nierman, "Evaluating Structural Similarity in XML Documents," 2002, 6 pages.

Peng et al., "Large-scale Incremental Processing Using Distributed Transactions and Notifications" Proceedings of the 9th USENIX Symposium on Operating Systems Design and Implementation, USENIX, 2010, pp. 14.

Reedy, Sarah, "Policy and Charging Rules Function (PCRF)," Sep. 13, 2010, http://www.lightreading.com/document.asp?doc_id=680015 printed Dec. 10, 2013 in 4 pages.

Stamos et al., "Remote Evaluation," Journal ACM Transactions on Programming Languages and Systems (TOPLAS), vol. 12, Issue 4, Oct. 1990, pp. 537-564.

"The Apache Cassandra Project," <http://cassandra.apache.org/> printed Sep. 14, 2011 in 3 pages.

Thomson et al., "The Case for Determinism in Database Systems," The 36th International Conference on Very Large Data Bases, Sep. 13-17, 2010, Singapore, Proceedings of the VLDB Endowment, vol. 3, No. 1, pp. 11.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System," Conference on Object-Oriented Technologies and Systems, Jun. 17-21, 1996, pp. 219-231.

Yang et al., "HTML Page Analysis Based on Visual Cues," 2001, pp. 859-864.

Official Communication for European Patent Application No. 14189344.6 dated Feb. 20, 2015.

Official Communication for European Patent Application No. 14199182.8 dated Mar. 13, 2015.

Official Communication for New Zealand Patent Application No. 623323 dated Apr. 17, 2014.

Official Communication for New Zealand Patent Application No. 623323 dated Jun. 6, 2014.

Official Communication for German Patent Application No. 10 2013 221 057.4 dated Mar. 23, 2015.

Official Communication for German Patent Application No. 10 2013 221 052.3 dated Mar. 24, 2015.

Official Communication for Great Britain Patent Application No. 1404553.8 dated Sep. 9, 2014.

Official Communication for New Zealand Patent Application No. 140199NZ/BP dated Mar. 18, 2014.

Claims for Australian Patent Application No. 2014201034 dated Jun. 2014, 5 pages.

Claims for Great Britain Patent Application No. 1404553.8 dated Sep. 2014, 5 pages.

Claims for New Zealand Patent Application No. 621812 dated Mar. 2014, 5 pages.

Claims for New Zealand Patent Application No. 140199NZ/BP dated Mar. 18, 2014, 5 pages.

Intellectual Property Office, "First Examination Report" in application No. 621812, dated Mar. 18, 2014, 2 pages.

\* cited by examiner

FAIR SCHEDULING FOR MIXED-QUERY LOADS

PRIORITY CLAIM

This application claims the benefit as a Continuation of application Ser. No. 13/826,228, filed Mar. 14, 2013, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to scheduling computer-executable tasks for execution by computing devices and, more specifically, to techniques for scheduling queries for execution by database management systems.

BACKGROUND

Many database management systems are available to help users manage data. One way such systems help users is to answer questions the users have about the data. In the context of database management systems, questions are typically referred to as "queries" and answers typically referred to as "results". Users submit queries to database management systems and receive answers to the queries in the form of results.

To answer queries, database management systems use computing resources such as memory and processor resources. Different queries require different amounts of computing resources to answer. For example, a query that returns 50,000 results may consume more computing resources than one that returns 10 results.

Many database management systems have the ability to execute multiple queries at the same time (i.e., concurrently). The process performed by a database management system of determining the results of a query is often referred to as "executing" the query. Multiple queries executed concurrently by a database management system can contend with each other for use of the same computing resources. Many database management systems perform synchronization and scheduling functions for the purpose of sharing computing resources amongst multiple concurrent query executions.

Unfortunately, despite these synchronization and scheduling efforts, problems can arise when database management systems execute multiple queries concurrently where some of the queries are "high cost" queries and others are "low cost" queries. With this type of mixed query-load, execution of the high cost queries can require use of so many computing resources that they "starve" low cost queries of computing resources. The result may be that the database management systems take a long amount of time to return answers to the low cost queries. Overall, some database management systems handle mixed query loads in such a way that latency of the low cost queries and the throughput of the query load are longer than users expect them to be.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF SOME EMBODIMENTS

A fair scheduling system with methodology for scheduling queries for execution by a database management system is described. In one embodiment, for example, a method is described for scheduling a query job for execution by a database management system as separately executable sub-query tasks. Each sub-query task can have a lower execution cost than the execution cost of the query job as a whole. Further, each sub-query task can have the same or approximately the same execution cost. The method may be performed multiply or concurrently for multiple query jobs.

The method includes obtaining the query job and a cost estimate to execute the job. As an example, the cost estimate may be a number of results the query job is expected to return.

The method further includes dividing the query job into a plurality of sub-query tasks based on the cost estimate exceeding a predetermined threshold cost.

The method further includes enqueing a query job item representing the query job onto the end (tail) of a job execution queue. When the query job item is enqueued, the job execution queue can contain other previously enqueued query job items corresponding to previously obtained query jobs.

After the query job item reaches the front (head) of the job execution queue which in typical operation does not occur until all previously enqueued query job items have been dequeued from the front of the job execution queue, the method further includes dequeing the query job item from the front of the job execution queue.

After dequeing the query job item, the method initiates execution of the first sub-query task of the query job by the database management system. After causing the database management system to begin executing the first sub-query task of the query job, the method determines whether there are more sub-query tasks of the query job to execute. If there are more sub-query tasks to execute, then the method again enqueues the query job item onto the end of the job execution queue. The dequeing of the query job item from the front of the job execution queue, initiating execution of the next sub-query task of the query job, and enqueing the query job item back onto the end of the job execution queue can be repeated until execution of all of the sub-query tasks of the query job have been initiated.

If, after dequeing a query job item from the front of the job execution queue and initiating execution of the last sub-query task, there are no more sub-query tasks to execute, then the query job item is not enqueued again onto the end of the job execution queue.

In some embodiments, the method enforces a maximum number of query job items that can be enqueued onto the job execution at the same time. In particular, a query job item for a newly obtained query job is not enqueued onto the end of the job execution queue if the number of query job items already in the job execution queue is at the maximum number. The query job item is enqueued onto the job execution after an existing query job item is dequeued and the method determines that there are no more sub-query tasks to execute for the query job corresponding to the dequeued query job item. Since multiple query jobs can be obtained when the number of query job items already in the job execution queue is at the maximum number, a separate queue can be maintained to hold query job items for query jobs that are waiting to be added to job execution queue. Enforcing the maximum number of query job items that can be enqueued onto the job execution at the same time effectively limits the number of sub-query tasks concurrently executed by the database management system and can avoid negatively affecting throughput of query loads with a large number of high cost queries.

Further features of various embodiments of the invention, its nature and various advantages will be more apparent from the accompanying drawings and the following detailed description.

DETAILED DESCRIPTION

Figure 1:
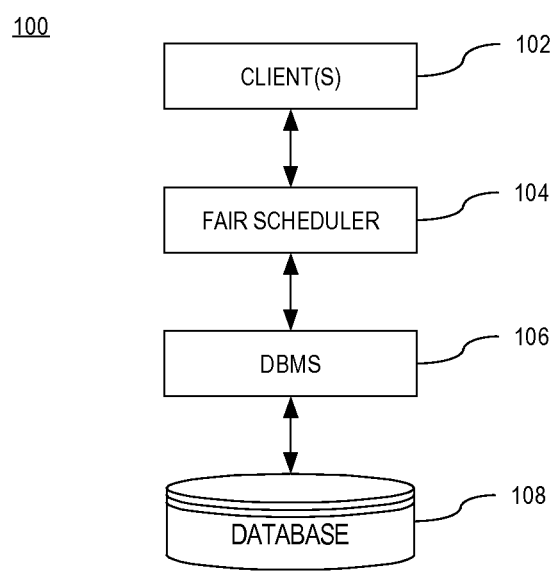
FIG. 1 is a block diagram illustrating a fair scheduling system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for fairly scheduling queries for execution by database management systems. In one embodiment, the techniques involve obtaining a computer-executable job and a cost estimate to execute the job. For example, the computer-executable job can be a query and the cost estimate can be a number of results the query is expected to return.

Based on the cost estimate exceeding a threshold cost, the job is divided into a sequence of computer-executable tasks. For example, if the query is expected to return 50,000 results and the threshold cost is 1,000 results, the query can be divided evenly into 50 sub-query tasks each of which returns 1,000 results. The techniques further involve enqueing a job item representing the job onto the end of a job execution queue. Other previously obtained jobs can be similarly divided and job items representing those other jobs similarly previously enqueued onto the end of the job execution queue.

After the job item for the job has reached the front of the job execution queue, the job item is dequeued from the front of the job execution queue. After dequeing the job item, the techniques further involve causing execution of the first task of the job to be initiated by a database management system. After initiating execution of the first task, a determination is made whether there are more tasks of the job to execute. If there are more tasks of the job to execute, the job item for the job is re-enqueued onto the end of the job execution queue. If there are no more tasks of the job to execute, then the job item is not re-enqueued. The dequeing, initiating execution of the next task of the job, and re-enqueing of the job item repeats until all tasks of the job have completed or the job is cancelled. The dequeing, initiating execution of the next task, and re-enqueing can be similarly repeated for all job items in the job execution queue.

According to one aspect, the techniques involving dividing a query job into multiple sub-query tasks where each sub-query task, when executed, returns a "page" of the results that the query job would return if executed as a single task. For example, a query job that is expected to return 50,000 results can be divided into 50 sub-query tasks where the first sub-query task returns the first 1,000 results of the 50,000 results, the second sub-query task returns the next 1,000 results of the 50,000 results, etc. to the fiftieth sub-query task of that returns the last 1,000 results of the 50,000 results.

Fair Scheduling System

FIG. 1 is a block diagram illustrating a fair scheduling system, according to an embodiment. The system 100 includes one or more clients 102 operatively coupled to fair scheduler 104. Fair scheduler 104 is operatively coupled to database management system 106 which is operatively coupled to database 108.

Clients 102 can be any set of one or more computing devices that submit query job requests to fair scheduler 104. Examples of clients 102 include, but are not limited to, personal computing devices, desktop computing devices, workstation computing devices, server computing devices, mobile phones, tablets, laptops or any other phone or general-purpose computing device that is executing software for submitting query job requests to fair scheduler 104. Clients 102 also may comprise processes or programs.

Clients 102 can be operated by users in which case the users can command clients 102 to submit query job requests to fair scheduler 104. Such commands can be caused by user interactions with graphical user interfaces or command line interfaces, for example. Alternatively, clients 102 can operate "unattended". In this case, an automated process executing on clients 102 can submit query job requests to fair scheduler 104. In addition, some clients 102 can be operated by users and other clients 102 can operate unattended. Thus, a mix of user-operated and unattended clients 102 is possible. In some usage scenarios, multiple clients 102 submit multiple query job requests to the fair scheduler 104 at or about the same time.

Fair scheduler 104 can be any set of one or more computing devices configured to perform any of the fair scheduling techniques described herein. Examples of fair scheduler 104 include, but are not limited to, personal computing devices, desktop computing devices, workstation computing devices, server computing devices, or any other general-purpose computing device that is executing software for performing any of the fair scheduling techniques described herein.

Database management system 106 can be any set of one or more computing devices used to execute queries against database 108. Examples of database management system 106 include, but are not limited to, personal computing devices, desktop computing devices, workstation computing devices, server computing devices, or any other general-purpose computing device that is executing database management software. The database management software can be any database management software capable of supporting any of the fair scheduling techniques disclosed herein. In one exemplary non-limiting embodiment, the database management software is a version of Apache Cassandra. In another exemplary non-limiting embodiment, the database management software is a version of Apache HBase.

Database 108 can be any set of one or more computing devices used to store data against which the database management system 106 executes queries. Examples of database 108 include, but are not limited to, personal computing devices, desktop computing devices, workstation computing devices, server computing devices, or any other general-purpose computing device that is storing database data managed by database management system 106.

In some embodiments such as the embodiment of the FIG. 1, clients 102, fair scheduler 104, database management system 106, and database 108 are each separate sets of computing devices. In other embodiments, one or more of clients 102, fair scheduler 104, database management system 106, and database 108 are the same set of computing devices in other embodiments. For example, client 102, fair scheduler 104, database management system 106, and database 108 can be the same computing device. Where more than one of clients 102, fair scheduler 104, database management system 106, and database 108 are the same set of computing devices, software components executing on the computing devices can execute as part of the same process or the same set of processes or in different processes or different sets of processes. For example, where the fair scheduler 104 and the database management system 106 are the same set of computing devices, software components for performing fair scheduling techniques described herein and software components for executing queries against database 108 can execute as part of the same Java Virtual Machine (JVM) process or set of processes.

If executing in separate processes or separate sets of processes, software components of clients 102, fair scheduler 104, and database management system 106 can communicate with each other using any suitable inter-process communications mechanism including, but not limited to, networking communications protocols such as, for example, Transmission Control Protocol/Internet Protocol (TCP/IP). If executing in the same process, the software components can communicate with each other through one or more Application Programming Interfaces (APIs).

Query Job Requests

In an embodiment, clients 102 submit query job requests to the fair scheduler 104. A query job request can contain values for query parameters and can contain a query execution cost estimate, among other information. As discussed in greater detail below, the fair scheduler 104 can use the query parameter values and the cost estimate in the query job request when causing sub-query tasks of query job to be executed by the database management system 106.

The query parameters can vary between different query jobs according to the requirements of the implementation at hand. One non-limiting example of a query job is: get the group of columns contained by a specified column family for a specified row of the column family that satisfy a specified column name range predicate. An example of such a query job expressed according a version of the Apache Cassandra Thrift API is:

```
get_slice("key" : key,
   "column_parent" : {"column_family" : column_family},
   "predicate" :
   { "slice_range" :
      { "start" : start_column_name,
        "end" : end_column_name,
        "reverse" : reverse,
        "count" : count }
   } )
```

In the above-example query job, there are six query parameters: key, column_family, start_column_name, end_column_name, reverse, and count. Other query jobs may have more or less query parameters or different query parameters. In the above-example query job, values for one or more of the six query parameters can be specified in a query job request. Values for any other query parameters that are not specified in the query job request can be provided by the fair scheduler. For example, a query job request can specify a value for the key parameter and a value for the start_column_name parameter and the fair scheduler 104 can provide values for the column_family, end_column_name, reverse, and count query parameters, as just one example.

In the above-example query job, the value of the key query parameter uniquely identifies a row in the column family specified by the value of the column_family parameter. The columns of that row of that column family can be ordered by column name. The value of the reverse parameter is a Boolean value. If the value of the reverse parameter is false, then the column name range predicate of the above-example query job restricts results to columns having a column name that is greater than or equal to the value of start_column_name parameter and less than or equal to the value of the end_column_name parameter. If the value of the reverse parameter is true, then the column name range predicate restricts results to columns having a column name that is less than or equal to the value of start_column_name parameter and greater than or equal to the value of the end_column_name parameter. The value of the count parameter limits the number results to the specified number of the columns that satisfy the column name range predicate.

Example Query Job Request

For the purpose of providing clear examples, embodiments of the fair scheduling techniques of the present disclosure are described hereinafter with respect to an example query job request. However, the techniques are not limited to the example query job request.

The example query job request follows an example use case in which network access information is stored in a column family of the database by network address of the accessing network device and the time of the network access.

Figure 2:
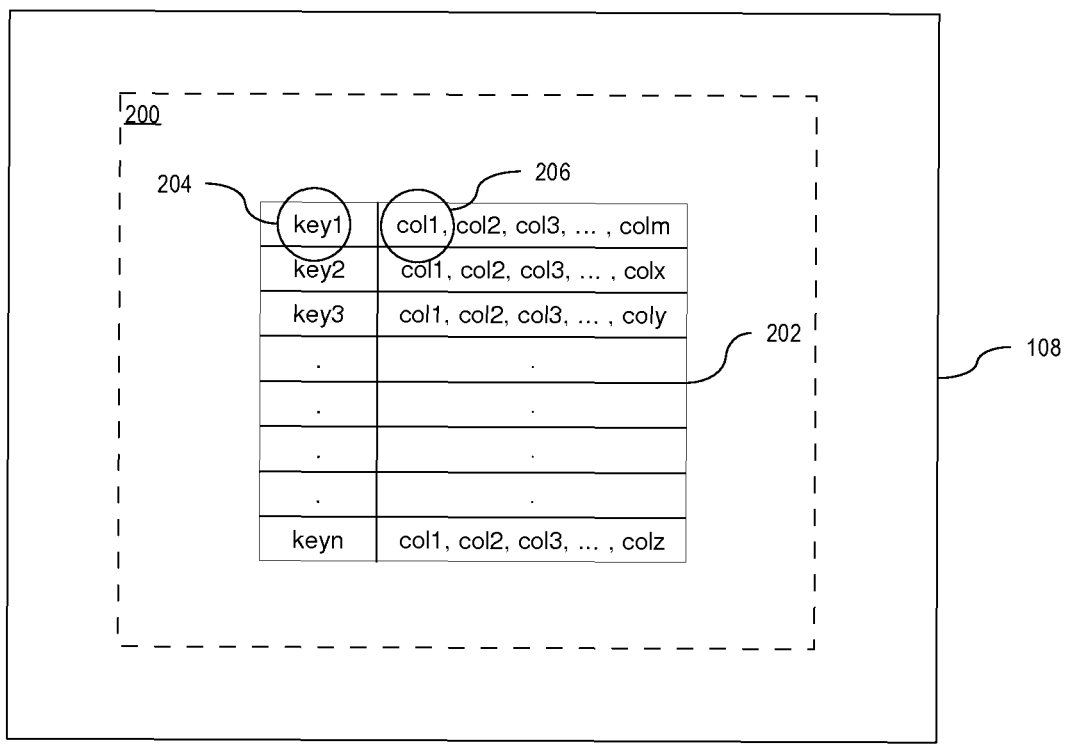
FIG. 2 is a block diagram illustrating a possible database data model for storing network access information, according to an embodiment.

A possible data model 200 of a database 108 for storing the network access information is illustrated in FIG. 2. The data model 200 includes a column family 202. The column family 202 contains one or more rows. Each row can be keyed by a unique key. For example, key 204 can uniquely identify the first row of column family 202. Each row can contain a set of zero or more ordered columns. Each column can have a name and a value. Within a row, each column name can be unique. The columns of a row can be ordered by column name according to an ordering scheme. Example ordering schemes include ASCII, UTF-8, Long, UUID (lexical or time), date, a combination two or more of the foregoing ordering schemes, and other ordering schemes. Different rows can have different numbers of columns. For example, one row can have only one column and another row can have a billion or more columns. Different column values may have different sizes. For example, one column value can be just a few bytes in size while another column value can be 1 gigabyte or more in size.

For the use case of storing network access information, each key of the column family 202 can be a network address. For example, key 204 may be an Internet Protocol (IP) address such as "192.168.0.10". The columns in a row of the column family 202 can store information about network access involving the network address identified by the key of the row. For example, each column of the row can correspond to a single network access event involving the network address. For example, the name of the column within a row can be a unique timestamp value (unique for a column name within the row) representing the date and time of the network access event and the value of the column can be information about the network access event such as information collected from network access logs, e-mail messages, call data records, etc.

In a variation of on the example use case, each column of a row can correspond to multiple network access events involving the network address. For example, the name of the column within the row can be a unique timestamp value (unique for a column name within the row) representing a range of time during which one or more network access events involving the network address occurred. The name of the column can correspond to the starting time of the range. Recalling that columns of a row can be stored in ascending order by column name, the ending time of the range can be determined from the name of the next column in the row. The value of the column can include one or more sub-values. The value can be variable length encoded or otherwise encoded or compressed. Each sub-value can correspond to a single network access event involving the network address. A sub-value corresponding to a network access event can have three parts:

An offset from the time in the column name. The time at which the corresponding network access event occurred can be determined from the column name and the offset;

A pointer to a block of information containing information about one or more network access events including the corresponding network address event. For example, the pointer can be a key and a column name of another column family that stores blocks of information about network access events.

A sub-block identifier that identifies, within the block of information identified by the pointer, sub-information about the corresponding network access event. For example, the sub-block identifier can be a byte offset range or a line number range that identifies the sub-information within the block of information.

Different query job requests can request different numbers of results. For example, with the example use cases, the number of results returned can depend on the range of time specified in the query job requests. For example, one query job request can request network access information involving a specified network address for a range of time that spans days, weeks, or months while another query job request can request network access information for a range of time that spans minutes. The query job request for the larger span of time can return tens of thousands of results or more while the query job request for the smaller span of time can return only ten results of less. If the larger query job is executed by the database management system 106 concurrently with the smaller query job, the latency of the smaller query job can be negatively affected by the concurrent execution of the larger query job.

Query Job Cost Estimate

As mentioned above, a query job request from a client 102 can include a cost estimate for the database management system 106 to execute the query job. For example, the query job request can specify the number of results the query job is expected to return. For example, for the above example query job involving network access information, a query job request can specify a number of columns that the query job is expected to return.

Alternatively, a query job request may not specify a query job cost estimate. In this case, the fair scheduler 104 may generate a query cost estimate. Such estimate may be generated in a number of different ways and the fair scheduler 104 is not limited to any particular way of generating a query cost estimate. For example, the fair scheduler 104 may generate a query cost estimate based on query parameters values specified in the query job request. For example, the fair scheduler 104 may ask the database management system 106 for a cost estimate providing the query parameter values for use by the database management system in generated the cost estimate. The database management system may not completely execute the query job when generating the estimate. The fair scheduler 104 may generate a query cost estimate in other ways and embodiments are not limited to any particular way of generating a query cost estimate.

As yet another alternative, a final query cost estimate may be generated based on a combination of a query cost estimate provided in a query job request and an preliminary query cost estimate generated by the fair scheduler 104. The preliminary cost estimate may be generated according to the approach in the previous paragraph, for example. For example, the fair scheduler 104 may generate the final query cost estimate based on a mathematical combination of the query cost estimate in the query job request and the preliminary query cost estimate generated by the fair scheduler. This alternative can be performed by the fair scheduler to reduce cost estimation errors relative the above approaches where only one of the query job request or the fair scheduler 104 provides the cost estimate.

Threshold Cost

As indicated above, the query cost estimate for a query job is used by the fair scheduler 104 to determine whether the query job should be broken down into separately executable sub-query tasks. This determination can be made by comparing the query cost estimate to a threshold cost. If the query cost estimate exceeds the threshold cost, then the fair scheduler can cause the query job to be executed by the database management system 106 as multiple sub-query tasks. If the query cost estimate is lower than the threshold cost, then the query job can be executed as a single query task.

The threshold cost can be predefined. For example, a query job with a cost estimate above 1,000 results can be broken up into multiple separately executable sub-query tasks. In this case, if the cost estimate is at or below 1,000, the query job can be executed as a single task.

The threshold cost can be determined based on query execution metrics collected for previously executed query jobs. Such metrics can include measured executions latencies of the previously executed query jobs. Execution latency for a query job can be measured, for example, as the time between:

when the query job starts execution and when the first result of the query job is returned, when the query job starts execution and when the last result of the query job is returned, a mathematical combination of the above two execution latency metrics.

Query execution metrics collected for previously executed query jobs can also include measured execution throughput. Measured execution throughput can be measured, for example, as the number of query jobs that start and finish execution within a certain period of time.

Collected query execution metrics can be used by the fair scheduler to adjust the threshold cost on an ongoing basis.

Dividing Query Jobs

As mentioned above, the fair scheduler can divide the query job into multiple sub-query tasks if the cost estimate for the query exceeds the threshold cost. In one approach, the fair scheduler divides the query job evenly based on the cost estimate and the current threshold cost. For example, if the cost estimate for a query job is 100,000 results and the current threshold cost is 1,000 results, the fair scheduler can divide the query job into 100 sub-query tasks each expected to return 1,000 results. By dividing each query job of a mixed-query load evenly, or approximately evenly, as separately executable sub-query tasks that are executed in a round-robin fashion through the job execution queue, the high cost query jobs of the mixed-load are executed fairly with the low cost query jobs of the mixed-load thereby preventing the high cost query jobs from starving the low cost query jobs for computing resources of the database management system.

In other approaches, query jobs are divided unevenly. For example, a query job that exceeds the threshold cost can be divided into multiple sub-query tasks where each successive sub-query task is expected to return fewer and fewer results (or, alternatively, more and more results).

Paging Query Results

The fair scheduler 104 can divide a query job into multiple sub-query tasks by using a result limiter for each of the sub-query tasks. The result limiter limits the number of results that the sub-query task returns when executed by the database management system 106. For example, the count query parameter can be used in the following sub-query task to limit the number of results returned when the sub-query task executed by the database management system 106 to at most the specified number of results.

```
get_slice("key" : key,
    "column_parent" : {"column_family" : column_family},
    "predicate" :
        { "slice_range" :
            { "start" : start_column_name,
              "end" : end_column_name,
              "reverse" : reverse,
              "count" : count }
        }
} )
```

If a sub-query task, when executed, actually returns the number of results specified as the result limiter, then the fair scheduler 104 can determine that more results of the query job are available. In this case, the fair scheduler 104 can configure the next sub-query task to get the next set of results based on the last result returned by the previous sub-query task. For example, given a threshold cost of 1,000 results and a query job request with a cost estimate of 10,000 results, the fair scheduler 104 can cause the database management system 106 to execute the following sub-query task to obtain the first 1,000 results:

```
get_slice("key" : key,
    "column_parent" : {"column_family" : column_family},
    "predicate" :
        { "slice range" :
            { "start" : start_column_name,
              "end" : ' ',
              "reverse" : reverse,
              "count" : 1000 }
        }
} )
```

In the above example sub-query task, the value ' ' for the end sub-parameter indicates to the database management system 106 that at most 1000 columns should be returned from the row keyed by the value for the key parameter starting with the column in the row having the name matching the value of the start_column_name parameter. If less than 1000 columns are returned by this sub-query task, then the query job is finished and no more sub-query tasks need be executed for the query job. If this is the case, the query estimate of 10,000 columns was inaccurate by an order of magnitude. If, as expected, 1,000 columns are returned by this sub-query tasks, then the next sub-query task for the query job can be configured based on the name of the last column returned by the previous sub-query task. For example, assume the parameter last column name holds as its value the name of the last column (e.g., the $1000^{th}$ column) returned by the first sub-query task that returned the first 1,000 columns. The fair scheduler 104 can cause the database management system to execute the following sub-query task to obtain the next 1,000 results:

```
get_slice("key" : key,
    "column_parent" : {"column_family" : column_family},
    "predicate" :
        { "slice_range" :
            { "start" : last_column_name,
              "end" : ' ',
              "reverse" : reverse,
              "count" : 1001 }
        }
} )
```

Here, since name of the last column returned by the previous sub-query task is provided as the value for the start parameter in this sub-query task, the first column returned by this sub-query task will be the same as the last column returned by the previous sub-query task. This is done to avoid inadvertently skipping columns between two consecutively executed sub-query tasks for a query job. Accordingly, a value of 1001 is provided for the count parameter to obtain the next 1,000 columns.

The above paging scheme assumes that the columns within a row are ordered by column name and the names of the columns within the row are unique within the row. More generally, the above paging scheme can be applied over a set of potential results in which each potential result is ordered within the set by a unique value associated with the potential result.

Method of Operation

The following description presents method steps that may be implemented using computer-executable instructions, for directing operation of a device under processor control. The computer-executable instructions may be stored on a computer-readable medium, such as hard disk, CD, DVD, flash memory, or the like. The computer-executable instructions may also be stored as a set of downloadable computer-executable instructions, for example, for downloading and installation from an Internet location (e.g., Web server).

Figure 3A:
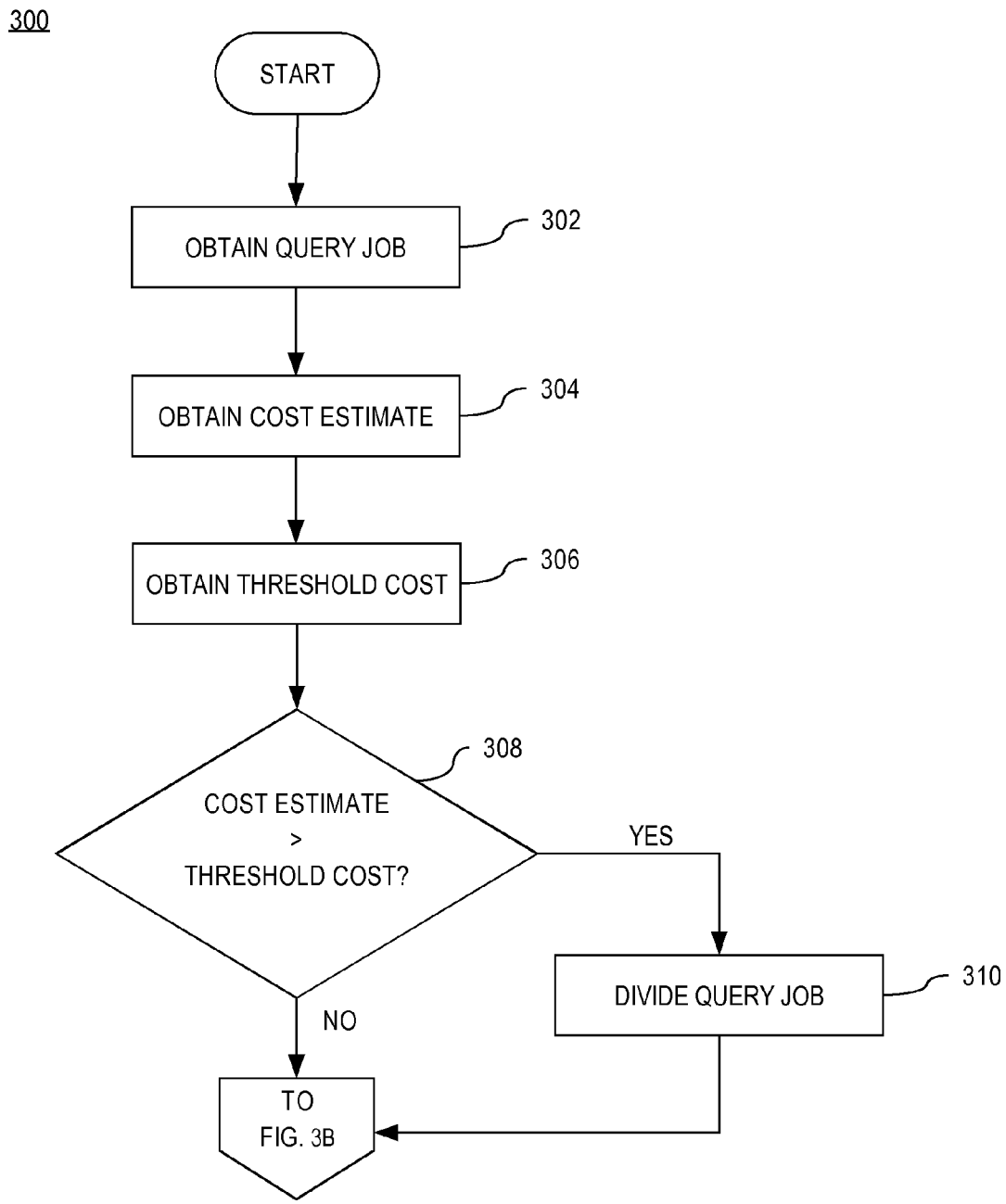
FIG. 3A and FIG. 3B comprise a single flowchart illustrating operation of the fair scheduling system according to an embodiment.
Figure 3B:
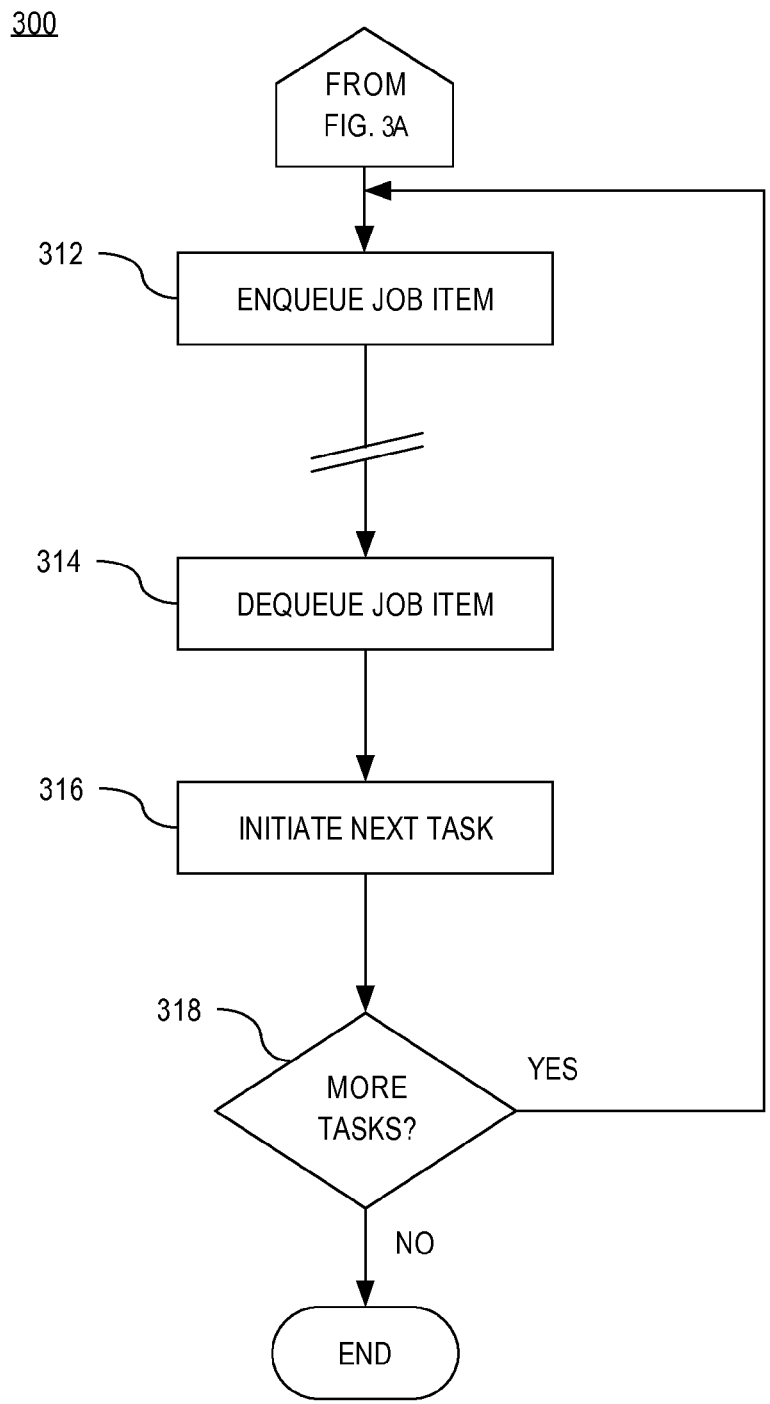

FIG. 3A and FIG. 3B comprise a single flowchart 300 illustrating overall operation of the fair scheduling system, according to an embodiment. The method of operation starts at step 302, with the system obtaining a query job. How the system obtains the query job is not of particular importance. For example, the system can obtain the query job in a query job request or some other way. At a minimum the query job contains a specification of one or more query parameters.

At step 304, the system obtains a cost estimate for the query job. As with the query job, how the system obtains the cost estimate is not particularly important. For example, the cost estimate may be specified in a query job request if the query job was obtained in a query job request. As another example, the cost estimate may be obtained from a cost analysis of the query job performed by the system. The cost analysis may be based on the query parameters specified in the query job.

At step 306, the system obtains a threshold cost in some manner. The threshold cost may be predetermined before step 302 (i.e., before the query job is obtained). Generally, a threshold cost is selected so that high cost query jobs are broken down into multiple separately executable lower cost sub-query tasks. If the threshold cost is too high, not enough high cost query jobs may be broken down into multiple separately executable lower cost sub-query tasks by the system thereby causing excessive starvation of concurrently executing low cost query jobs for shared computing resources. If, on the other hand, the threshold cost is too low, low cost query jobs may be unnecessarily broken down into multiple separately executable lower cost sub-query tasks by the system thereby causing excessive latency for the low cost query jobs.

The threshold cost may be configured by an administrator of the system. During operation, the system may dynamically adjust the threshold cost based on query workload history. Such history may include query execution metrics for low cost and high cost query jobs. Such query execution metrics can include latency and throughput of query jobs, among other metrics.

At step 308, the system determines whether the obtained cost estimate exceeds (or equals) the obtained threshold cost. If so, system determines (step 310) to divide the query job into multiple separately executable sub-query tasks. The division may be based on the cost estimate and the threshold cost. For example, the query job can be divided evenly into N sub-query tasks where N is the ((cost estimate/threshold cost)+1). In this case, the first N−1 tasks would be expected to have equal execution cost. The Nth task would be expected to have at most the execution cost of one of the first N−1 tasks. If the system determines that the obtained cost estimate does not exceed (or equals) the obtained threshold cost, then the query job is not divided and executed as a single query task.

Whether the query job is divided or not, at step 312, a job item representing the query job is enqueued to the end of a job execution queue. The job execution queue holds up to M number of job items where M represents the maximum number of query jobs that the system will allow the database management system to concurrently execute query tasks for. Like the threshold cost, the size of the job execution queue (e.g., the maximum number M of job items allowed in the job execution queue at one time) may be predetermined and/or dynamically adjusted based on query workload history. If the job execution queue has M job items in it when a new query job is obtained at step 302 (i.e., the job execution queue is full), then the system may block further processing of the new query job until an existing query job finishes execution (e.g., until an existing query job is cancelled and the job item for the query job is removed from the job execution queue or until all sub-query tasks of an existing query job have been executed and the job item for the query is dequeued from the job execution queue). The system may maintain another queue for ordering and tracking new query jobs that are obtained when the job execution queue is full.

At step 314, the job item enqueued at step 312 is dequeued after the job item reaches the front of the job execution queue. The job item will not reach the front of the job execution queue until all job items closer to the front of the job execution queue have been dequeued or removed from the job execution queue. Among other information, a job item representing a query job enqueued onto the job execution queue may contain query job specification data such as query parameters for the query job. The job item may also contain fair scheduling bookkeeping data such as (a) the number of sub-query tasks the query job was divided into, if the query job was divided at step 310, (b) a numerical result limiter to be used for all sub-query tasks or per-sub-query tasks numerical result limiters, and (c) a paging value representing the last result returned from the most recently completed sub-query task which can be used to configure the next sub-query task.

At step 316, the system causes the next sub-query task to be executed by the database management system. If the query job was not divided, the next sub-query task will be the only query task executed for the query job. If the query job was divided, then the next sub-query task is configured with a result limiter that limits the number of results returned by the database management system.

At step 318, the system determines if there are more sub-query tasks of the query job to execute. If so, the method returns to step 312 to re-enqueue the job item for the query job to the end of the job execution queue. If, at step 318, there are no more sub-query tasks to execute, then the query job is considered to be finished and the job item for the query job is not re-enqueued to the end of the job execution queue.

Scheduling query jobs through the job execution may be performed by the system to ensure a fair scheduling of mixed query loads. Through the system's use of the job execution queue, both high cost and low cost query jobs may be fairly and concurrently executed by the database management system in a round-robin fashion.

Cancelling a Query Job

It may be the case that execution of a sub-query task for a query job by the database management system is not progressing. For this or some other reason, a user of the fair scheduling system may wish to cancel a currently executing query job. Accordingly, in some embodiments, a request to the fair scheduling system to cancel a currently executing query job is received. Upon receiving the cancel request, the fair scheduling system removes the job item corresponding to the query job from the job execution queue. As a result, no further sub-query tasks of query job will be executed. This cancellation may have no effect on execution of the currently sub-query tasks In some embodiments in which the database management system operates on multiple computing nodes, the system re-submits a cancelled query job as a new query job with the same query parameters but for execution on a different computing node than the computing device that the cancelled query job was last executing on when cancelled. This is useful if the reason the cancelled query job was not progressing was because of a problem particular to the computing node on which the cancelled query job was last executing.

The cancellation request may be provided by a user through a graphical user interface presented on the user's personal computing device. For example, the user interface may present a list of currently executing query jobs and associated interactive graphical user interface elements for cancelling selected query jobs.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
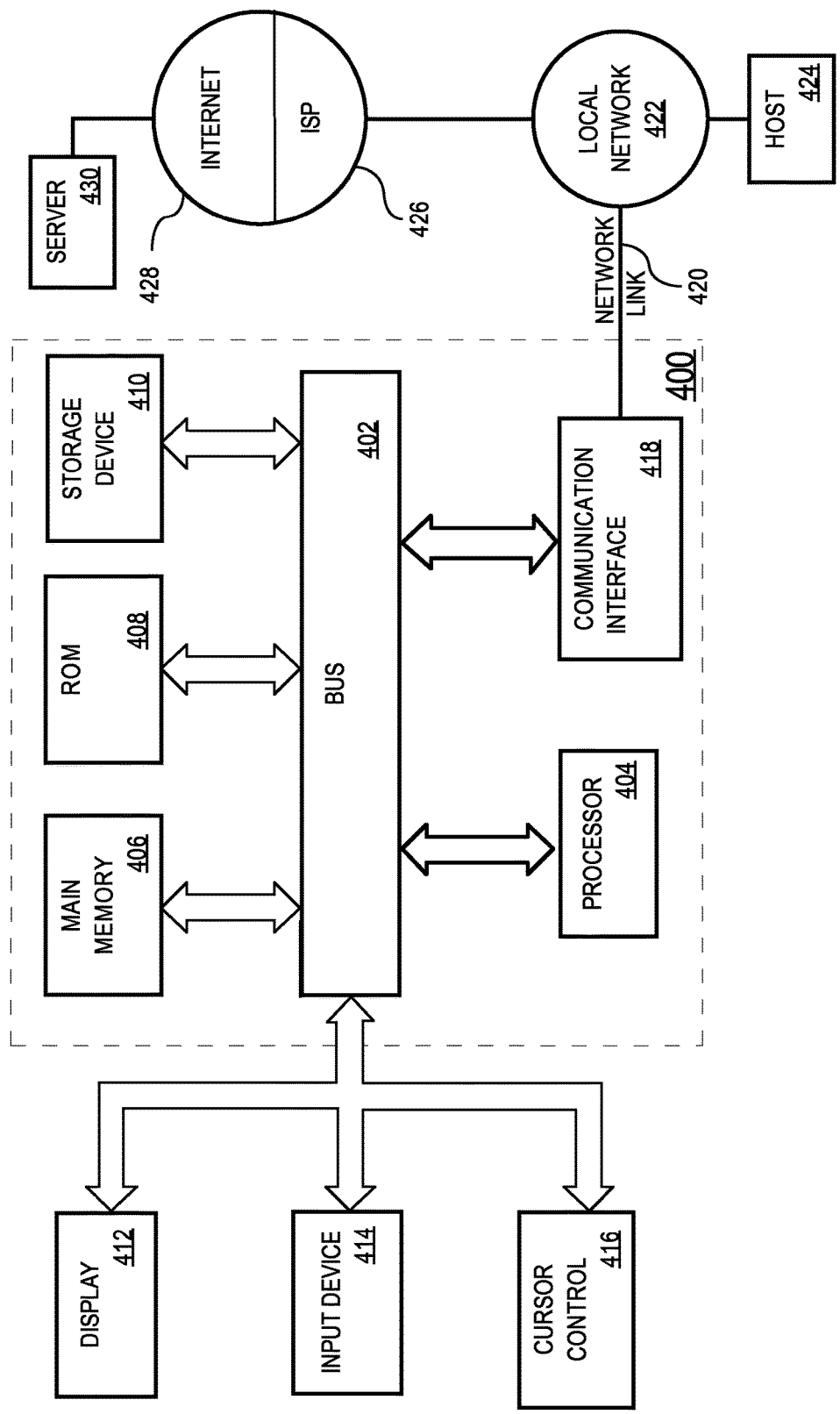
FIG. 4 is a block diagram of a computer system upon which embodiments can be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method performed via one or more processors, the method comprising:
   obtaining, via at least one of the one or more processors, a query job for execution by a database management system and a cost estimate for the database management system to execute the query job;
   based on the cost estimate, dividing, via at least one of the one or more processors, the query job into a plurality of sub-query tasks for execution by the database management system;
   causing, via at least one of the one or more processors, the plurality of sub-query tasks to be executed by the database management system;
   after the database management system has finished executing a first sub-query task of the plurality of sub-query tasks, determining, via at least one of the one or more processors, a value of a last result returned by the database management system for the first sub-query task; and
   causing, via at least one of the one or more processors, the database management system to initiate execution of a next sub-query task of the plurality of sub-query tasks;
   wherein the next sub-query task includes the determined value of the last result returned by the database management system for the first sub-query task;
   wherein the first sub-query task includes a rate limiter that limits the number of results returned by the first sub-query task when executed by the database management system.

2. The method of claim 1, wherein the cost estimate is a number of results the database management system is expected to return as an answer to the query job.

3. The method of claim 2, wherein each sub-query task of the plurality of sub-query tasks is configured to cause the database management system to return less than the number of results of the cost estimate.

4. The method of claim 1, wherein causing each of the plurality of sub-query tasks to be executed by the database management system comprises:
   enqueing, via at least one of the one or more processors, a job item representing the query job onto the end of a job execution queue having a front and an end;
   dequeing, via at least one of the one or more processors, the job item after the job item has reached the front of the job execution queue;
   after the job item is de-queued, causing, via at least one of the one or more processors, the database management system to execute a sub-query task of the plurality sub-query tasks;
   after the sub-query task is completely executed by the database management system, determining, via at least one of the one or more processors, whether there are more sub-query tasks of the plurality of sub-query tasks to be executed by the database management system;
   in response to determining, via at least one of the one or more processors, that there are more sub-query tasks of the plurality of sub-query tasks to be executed by the database management system, re-enqueing, via at least one of the one or more processors, the job item onto the end of the job execution queue; and
   wherein the job item re-enqueued onto the end of the job execution queue indicates that the sub-query task is completely executed.

5. The method of claim 1, wherein the query job is obtained in a job request.

6. The method of claim 1, wherein the cost estimate is obtained in a job request.

7. The method of claim 1, wherein the query job comprises one or more query parameters.

8. The method of claim 1, further comprising:
   in response to receiving, via at least one of the one or more processors, a request to cancel the query job, removing, via at least one of the one or more processors, a job item representing the query job from a job execution queue.

9. The method of claim 1, further comprising:
   at a first time, removing, via at least one of the one or more processors, a job item representing a first query job from a job execution queue having a front and an end;
   wherein, at the first time, a sub-query task of the first query job is executing on a first computing node of the database management system; and
   at a second time that is after the first time:
      generating, via at least one of the one or more processors, a second query job based on the first query job,
      enqueing, via at least one of the one or more processors, a job item representing the second query job onto the end of the job execution queue, and
      causing, via at least one of the one or more processors, the database management system to initiate execution of a first sub-query task of the second query job on a second computing node of the database management system that is not the first computing node.

10. The method of claim 1, further comprising:
   determining, via at least one of the one or more processors, if a job execution queue is full with jobs items;
   wherein each job item, of the jobs items in the jobs execution queue, represents a query job for which execution of at least a portion of the query job by the database management system is initiated but not complete;
   enqueing, via at least one of the one or more processors, a job item representing a new query job onto the end of the job execution queue only if the job execution queue is not full; and
   if the job execution queue is full, waiting, via at least one of the one or more processors, until the job execution queue is no longer full before enqueing the job item representing the new query job onto the end of the job execution queue.

11. One or more non-transitory computer-readable media storing one or more computer programs which, when executed via one or more processors, causes performance of the steps of:
  obtaining, via at least one of the one or more processors, a query job for execution by a database management system and a cost estimate for the database management system to execute the query job;
  based on the cost estimate, dividing, via at least one of the one or more processors, the query job into a plurality of sub-query tasks for execution by the database management system;
  causing, via at least one of the one or more processors, the plurality of sub-query tasks to be executed by the database management system;
  after the database management system has finished executing a first sub-query task of the plurality of sub-query tasks, determining, via at least one of the one or more processors, a value of a last result returned by the database management system for the first sub-query task; and
  causing, via at least one of the one or more processors, the database management system to initiate execution of a next sub-query task of the plurality of sub-query tasks;
  wherein the next sub-query task includes the determined value of the last result returned by the database management system for the first sub-query task;
  wherein the first sub-query task includes a rate limiter that limits the number of results returned by the first sub-query task when executed by the database management system.

12. The one or more non-transitory computer-readable media of claim 11, wherein the cost estimate is a number of results the database management system is expected to return as an answer to the query job.

13. The one or more non-transitory computer-readable media of claim 12, wherein each sub-query task of the plurality of sub-query tasks is configured to cause the database management system to return less than the number of results of the cost estimate.

14. The one or more non-transitory computer-readable media of claim 11, wherein the step of causing each of the plurality of sub-query tasks to be executed by the database management system comprises the steps of:
  enqueing, via at least one of the one or more processors, a job item representing the query job onto the end of a job execution queue having a front and an end;
  dequeing, via at least one of the one or more processors, the job item after the job item has reached the front of the job execution queue;
  after the job item is de-queued, causing, via at least one of the one or more processors, the database management system to execute a sub-query task of the plurality sub-query tasks;
  after the sub-query task is completely executed by the database management system, determining, via at least one of the one or more processors, whether there are more sub-query tasks of the plurality of sub-query tasks to be executed by the database management system;
  in response to determining, via at least one of the one or more processors, that there are more sub-query tasks of the plurality of sub-query tasks to be executed by the database management system, re-enqueing, via at least one of the one or more processors, the job item onto the end of the job execution queue; and
  wherein the job item re-enqueued onto the end of the job execution queue indicates that the sub-query task is completely executed.

15. The one or more non-transitory computer-readable media of claim 11, wherein the query job comprises one or more query parameters.

16. The one or more non-transitory computer-readable media of claim 11, wherein the one or more computer programs, when executed via the one or more processors, further causes performance of the steps of:
  in response to receiving, via at least one of the one or more processors, a request to cancel the query job, removing, via at least one of the one or more processors, a job item representing the query job from a job execution queue.

17. The one or more non-transitory computer-readable media of claim 11, wherein the one or more computer programs, when executed via the one or more processors, further causes performance of the steps of:
  at a first time, removing, via at least one of the one or more processors, a job item representing a first query job from a job execution queue having a front and an end;
  wherein, at the first time, a sub-query task of the first query job is executing on a first computing node of the database management system; and
  at a second time that is after the first time:
    generating, via at least one of the one or more processors, a second query job based on the first query job,
    enqueing, via at least one of the one or more processors, a job item representing the second query job onto the end of the job execution queue, and
    causing, via at least one of the one or more processors, the database management system to initiate execution of a first sub-query task of the second query job on a second computing node of the database management system that is not the first computing node.

18. The one or more non-transitory computer-readable media of claim 11, wherein the one or more computer programs, when executed via the one or more processors, further causes performance of the steps of:
  determining, via at least one of the one or more processors, if a job execution queue is full with jobs items;
  wherein each job item, of the jobs items in the jobs execution queue, represents a query job for which execution of at least a portion of the query job by the database management system is initiated but not complete;
  enqueing, via at least one of the one or more processors, a job item representing a new query job onto the end of the job execution queue only if the job execution queue is not full; and
  if the job execution queue is full, waiting, via at least one of the one or more processors, until the job execution queue is no longer full before enqueing the job item representing the new query job onto the end of the job execution queue.

* * * * *